M. V. LONGSWORTH.
Pad Loop-Hook.

No. 211,245. Patented Jan. 7, 1879.

WITNESSES
Villette Anderson.
F. J. Masi.

INVENTOR
Miron V. Longsworth
by E. W. Anderson,
ATTORNEY

UNITED STATES PATENT OFFICE.

MIRON V. LONGSWORTH, OF DELPHOS, OHIO.

IMPROVEMENT IN PAD-LOOP HOOKS.

Specification forming part of Letters Patent No. 211,245, dated January 7, 1879; application filed June 8, 1878.

*To all whom it may concern:*

Be it known that I, MIRON V. LONGSWORTH, of Delphos, in the county of Allen and State of Ohio, have invented a new and valuable Improvement in Pad-Loop Hooks; and I do hereby declare that the following is a full, clear, and exact description of the construction and operation of the same, reference being had to the annexed drawings, making a part of this specification, and to the letters and figures of reference marked thereon.

Figure 1:
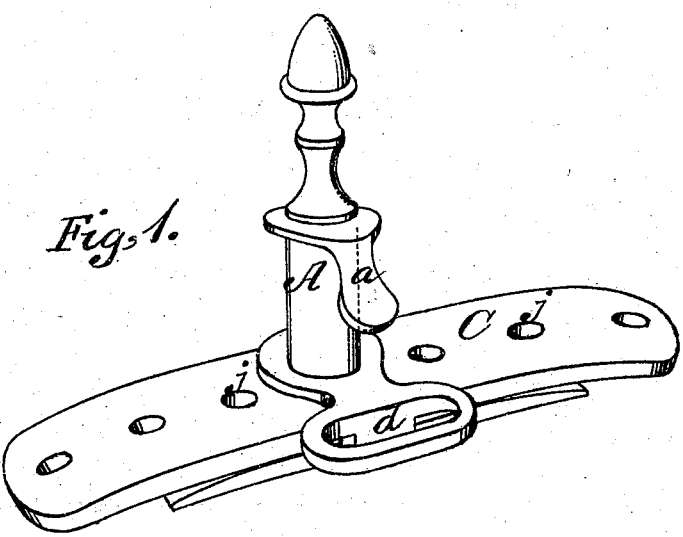
Figure 2:
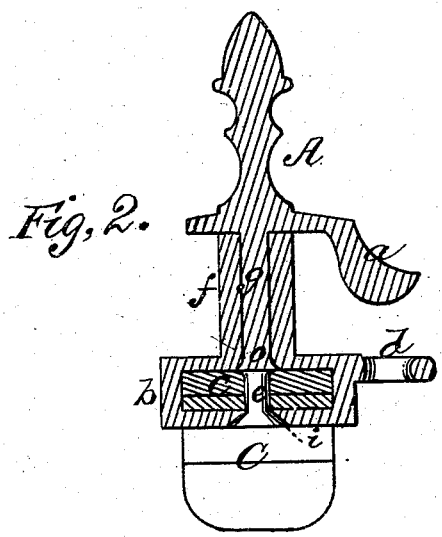

Figure 1 of the drawings is a representation of a perspective view of my improved pad-loop hook, and Fig. 2 is a vertical central section of the same.

This invention has relation to improvements in water or check-rein hooks for harness.

The object of the invention is to construct a hook that may be used in connection with a soft saddle-pad or one having no resisting substance in its composition.

The nature of the invention consists in the construction and novel arrangement of a post having a sleeve and a transverse base-loop, with broadly-extended top and bottom walls, the check-rein hook, provided with a solid shank, and the crupper-loop of a saddle-strap extending through the base-loop, and a pin securing the said strap to the loop, as will be hereinafter fully shown and described.

In the annexed drawings, the letter A designates an upright metallic post, having a check-rein hook, a, formed thereon. At the base of this post, and at right angles to the plane of the hook, is a horizontal box-loop, b, the upper and lower walls of which are broadly extended and sufficiently spaced to receive the saddle-strap C between them. The extending of the loop-walls forms a broad base, that affords a sufficient rest to the hook on the soft pad. The lower wall of loop b has a countersunk perforation, i, made in it in line with a series of perforations, j, in saddle-strap C, and the latter is secured to the loop by means of a removable headed pin, e, extending through the loop-wall and saddle-strap, with its head buried in the countersink of perforation i.

At the rear edge of the post A, above the loop b, is formed a second loop, d, to which the crupper-strap is secured in the usual way. The post A is usually composed of two parts—namely, a metallic sleeve, f, carrying the loops b d, and the hook a, having the solid shank g, extending through the said sleeve, and having its end upset, as shown at o, to prevent it from casual detachment therefrom; but I may cast it in one piece if I so elect.

The device above set forth is secured to the pad by buckling the ends of the strap C thereto; but I may use other means, as riveting, sewing, and the like, and I may carry the said strap completely around the animal's body and provide it with eyes to receive and support the thills.

What I claim as new, and desire to secure by Letters Patent, is—

The combination, with the post A, of the sleeve f, having a transverse base-loop, b, with broadly-extended top and bottom walls, the hook a, having a solid shank, g, and the crupper-loop d of a saddle-strap, C, extending through the base-loop, and a pin, e, securing the said strap to the loop, substantially as specified.

In testimony that I claim the above I have hereunto subscribed my name in the presence of two witnesses.

MIRON V. LONGSWORTH.

Witnesses:
 B. J. BROTHERTON,
 H. A. REEVE.